United States Patent
Saito

(10) Patent No.: US 12,098,928 B2
(45) Date of Patent: Sep. 24, 2024

(54) INFORMATION PROCESSING DEVICE AND INFORMATION PROCESSING METHOD

(71) Applicant: SONY GROUP CORPORATION, Tokyo (JP)

(72) Inventor: Mari Saito, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 286 days.

(21) Appl. No.: 17/615,459

(22) PCT Filed: Apr. 2, 2020

(86) PCT No.: PCT/JP2020/015185
§ 371 (c)(1),
(2) Date: Nov. 30, 2021

(87) PCT Pub. No.: WO2020/250549
PCT Pub. Date: Dec. 17, 2020

(65) Prior Publication Data
US 2022/0228879 A1    Jul. 21, 2022

(30) Foreign Application Priority Data
Jun. 11, 2019  (JP) .................. 2019-108329

(51) Int. Cl.
*G01C 21/36* (2006.01)
*G06F 3/16* (2006.01)
*G08G 1/005* (2006.01)

(52) U.S. Cl.
CPC .......... *G01C 21/3614* (2013.01); *G06F 3/16* (2013.01); *G08G 1/005* (2013.01)

(58) Field of Classification Search
CPC ....... G01C 21/3614; G01C 21/20; G06F 3/16; G06F 3/167; G08G 1/005
See application file for complete search history.

(56) References Cited

U.S. PATENT DOCUMENTS

| 8,738,638 B1* | 5/2014 | Koshelev | ........... G01C 21/3878 |
| | | | 707/688 |
| 2006/0271287 A1* | 11/2006 | Gold | ................... G06F 3/04812 |
| | | | 701/426 |

(Continued)

FOREIGN PATENT DOCUMENTS

| CN | 103458838 A | 12/2013 |
| JP | 2006-023241 A | 1/2006 |

(Continued)

OTHER PUBLICATIONS

English translation of Written Opinion of the International Searching Authority for PCT/JP2020/015185. Date of mailing Jul. 7, 2020. (Year: 2020).*

(Continued)

*Primary Examiner* — Calvin Cheung
(74) *Attorney, Agent, or Firm* — CHIP LAW GROUP

(57) ABSTRACT

An information processing device includes: a recognition unit (21) that recognizes a surrounding environment of a current position of a user; a guide control unit (22) that generates guide information corresponding to a characteristic of the user by using a recognition result of the recognition unit and that causes an output device to perform an output thereof; and a change detection unit (23) that detects a changed portion in the surrounding environment of the current position in a case where it is determined that the user has visited the current position in the past, wherein in a case where the change detection unit detects the changed portion, the guide control unit generates the guide information including information causing the user to recognize the changed portion.

12 Claims, 8 Drawing Sheets

(56) References Cited

U.S. PATENT DOCUMENTS

| | | | | |
|---|---|---|---|---|
| 2007/0210937 | A1* | 9/2007 | Smith | G06Q 30/02 340/995.1 |
| 2012/0033032 | A1* | 2/2012 | Kankainen | H04N 21/2187 348/E7.001 |
| 2012/0124461 | A1* | 5/2012 | Barnett | G09B 29/10 715/230 |
| 2012/0216149 | A1* | 8/2012 | Kang | G06F 3/04815 715/848 |
| 2014/0085446 | A1 | 3/2014 | Hicks | |
| 2014/0351064 | A1* | 11/2014 | Kritt | G06Q 30/0276 382/218 |
| 2015/0178257 | A1* | 6/2015 | Jones | G06T 19/006 345/419 |
| 2015/0235398 | A1* | 8/2015 | Kim | G06T 7/74 345/633 |
| 2016/0225286 | A1 | 8/2016 | Dayal | |
| 2016/0239750 | A1* | 8/2016 | Haas | G06Q 50/16 |
| 2019/0304026 | A1* | 10/2019 | Lyman | G06Q 40/08 |

FOREIGN PATENT DOCUMENTS

| | | |
|---|---|---|
| JP | 2014-508596 A | 4/2014 |
| JP | 2016-143060 A | 8/2016 |
| JP | 2018-132528 A | 8/2018 |
| KR | 10-2014-0033009 A | 3/2014 |

OTHER PUBLICATIONS

JP 3703297 B2 with English translation; date filed Apr. 27, 1998; date published Oct. 5, 2005. (Year: 2005).*

JP 2011243164 A with English translation; date filed May 21, 2010; date published Dec. 1, 2011. (Year: 2011).*

JP 2006058103 A with English translation; date filed Aug. 19, 2004; date published Mar. 2, 2006. (Year: 2006).*

International Search Report and Written Opinion of PCT Application No. PCT/JP2020/015185, issued on Jul. 7, 2020, 08 pages of ISRWO.

* cited by examiner

| USER ID | CHARACTERISTIC | SET DESTINATION |
|---|---|---|
| U01 | IMPAIRED COLOR VISION | (123, 456) |
| U02 | SHORT STATURE | --- |
| U03 | FOREIGNER | --- |
| ⋮ | ⋮ | ⋮ |

USER ID: U01

| POSITIONAL INFORMATION | HISTORY IMAGE | TIME |
|---|---|---|
| (abc, def) | XXX, ⋯ | ○○○ |
| (ghi, jkl) | YYY, ⋯ | △△△ |
| (mno, pqr) | ZZZ, ⋯ | □□□ |
| ⋮ | ⋮ | ⋮ |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/015185 filed on Apr. 2, 2020, which claims priority benefit of Japanese Patent Application No. JP 2019-108329 filed in the Japan Patent Office on Jun. 11, 2019. Each of the above-referenced applications is hereby incorporated herein by reference in its entirety.

FIELD

The present disclosure relates to an information processing device, an information processing method, and a program.

BACKGROUND

Conventionally, a technology of assisting traveling of a user by recognizing a surrounding environment of a current position of the user, generating guide information, and outputting the guide information from an output device such as a display or a speaker has been known. Such a technology is used, for example, in a visual assistance device for a visually impaired person, a navigation system that guides a user to a destination, and the like.

CITATION LIST

Patent Literature

Patent Literature 1: Japanese Patent Application Laid-open No. 2016-143060
Patent Literature 2: Japanese Patent Application Laid-open No. 2018-132528

SUMMARY

Technical Problem

In the above-described traveling assistance technology using guide information, there is a concern that presenting guide information less useful for a user makes the user feel annoyed. Thus, it is desirable to accurately determine usefulness of the guide information and to present the guide information highly useful for the user.

The present disclosure proposes an information processing device, information processing method, and program capable of presenting guide information highly useful for a user and appropriately assisting traveling of the user.

Solution to Problem

In order to solve the problem, an information processing device according to an embodiment of the present disclosure comprises: a recognition unit that recognizes a surrounding environment of a current position of a user; a guide control unit that generates guide information corresponding to a characteristic of the user by using a recognition result of the recognition unit and that causes an output device to perform an output thereof; and a change detection unit that detects a changed portion in the surrounding environment of the current position in a case where it is determined that the user has visited the current position in a past, in the information processing device, in a case where the change detection unit detects the changed portion, the guide control unit generates the guide information including information causing the user to recognize the changed portion.

BRIEF DESCRIPTION OF DRAWINGS

FIG. 4 is a view illustrating a configuration example of a user data table.
FIG. 5 is a view illustrating a configuration example of a user traveling history table.

DESCRIPTION OF EMBODIMENTS

In the following, embodiments of the present disclosure will be described in detail with reference to the accompanying drawings. Note that the description will be made in the following order of items.

1. Outline of embodiment
2. Description of traveling assistance system according to embodiment
3. Modification example
4. Hardware configuration example
5. Supplementary note

1. Outline of Embodiment

For example, a traveling assistance system that assists traveling of a user by using an information equipment used by the user (hereinafter, referred to as "user terminal"), such as a smartphone is known. This traveling assistance system performs recognition processing on an image of a surrounding environment of a current position which image is captured by a camera mounted on the user terminal, a sound recorded by a microphone, and the like, and generates guide information by using an acquired recognition result. Then, the generated guide information is superimposed on the image captured by the camera and is displayed on a display, or is output as a sound from a speaker, whereby traveling of the user is assisted.

Here, the guide information includes various kinds of information generated by utilization of the recognition result. Examples of the guide information include text describing an object detected from the image, a mark to direct attention to the object that serves as a landmark, text acquired as a result of character recognition in which characters in the image are recognized, text acquired as a result of speech recognition on a sound recorded by the microphone, a guide mark to guide the user to a destination, text or a sound to guide the user to the destination, and the like.

Figure 1:
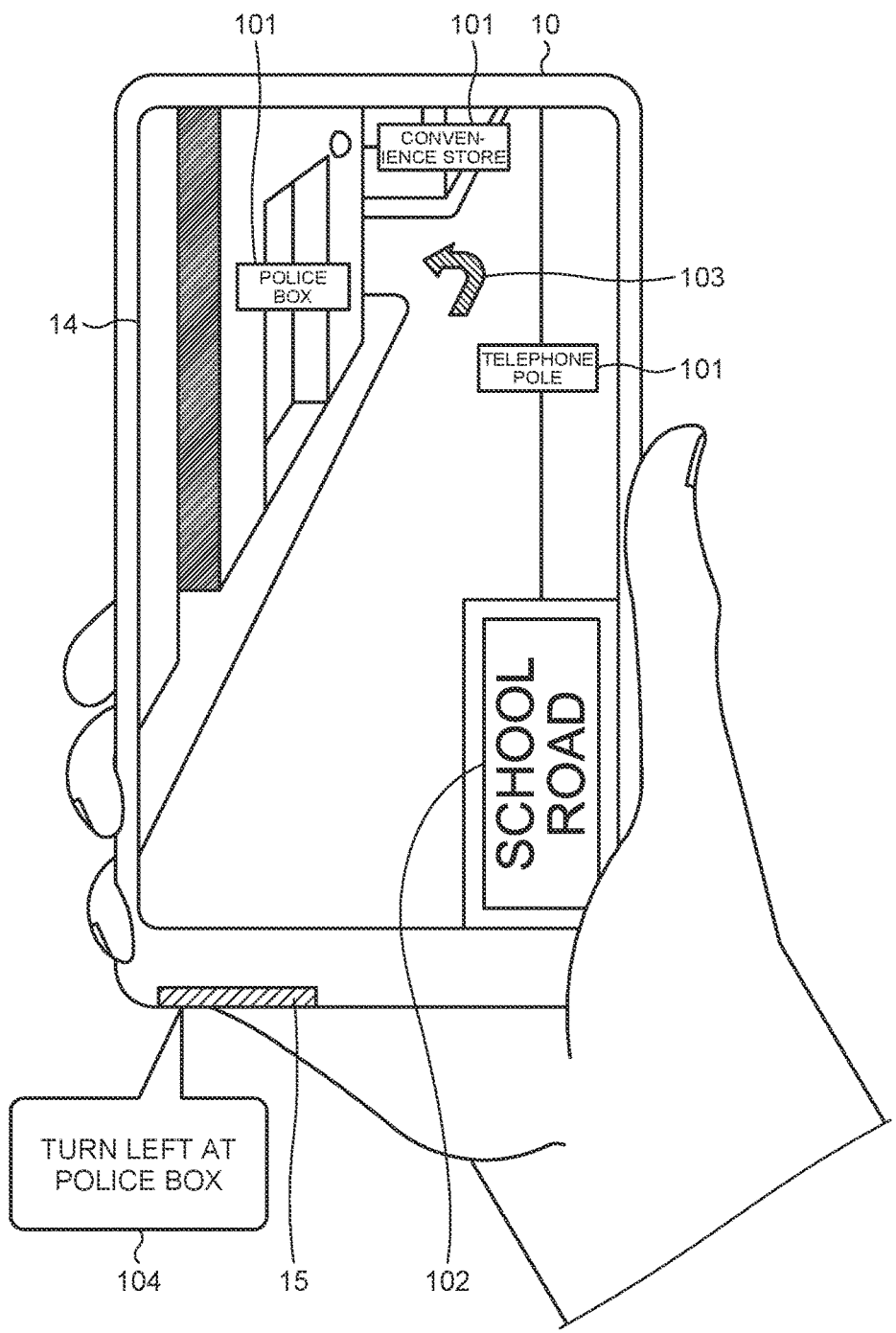
FIG. 1 is a view illustrating an example of traveling assistance.

FIG. 1 is a view illustrating an example of traveling assistance in a case where a smartphone is used as a user terminal. In this example illustrated in FIG. 1, an image of a surrounding environment of a current position which image is captured by a camera mounted on a user terminal 10 is displayed on a display 14, and text 101 describing an object detected from the image, text 102 acquired as a result of character recognition in which characters in the image are recognized, a guide mark 103 to guide the user to a destination, and the like are superimposed on the image. Also, a sound 104 to guide the user to the destination is output from a speaker 15 mounted on the user terminal 10.

In a case of performing such traveling assistance, presenting miscellaneous guide information makes the user feel annoyed. Thus, it is important to selectively present guide information highly useful for the user. It is considered that guide information highly useful for a user is not common to all users and varies depending on characteristics of individual users. For example, the highly useful guide information varies between a visually impaired person and a healthy person.

In addition, the guide information highly useful for the user also varies depending on a situation in which the guide information is output. For example, at a position where the user has visited in the past, the user often feels annoyed when the same guide information as the past visit is repeatedly output. On the other hand, in a case where there is a change in a surrounding environment of the position, such as a case where what is used as a landmark in the past visit has disappeared or an appearance thereof has changed, it is considered that usefulness of guide information causing the user to recognize the change is high.

Thus, in an embodiment of the present disclosure, a technical idea that can appropriately assist traveling of the user by presenting guide information highly useful for the user in consideration of a characteristic of the user, a situation of outputting the guide information, and the like is proposed.

2. Description of Traveling Assistance System According to Embodiment

Figure 2:
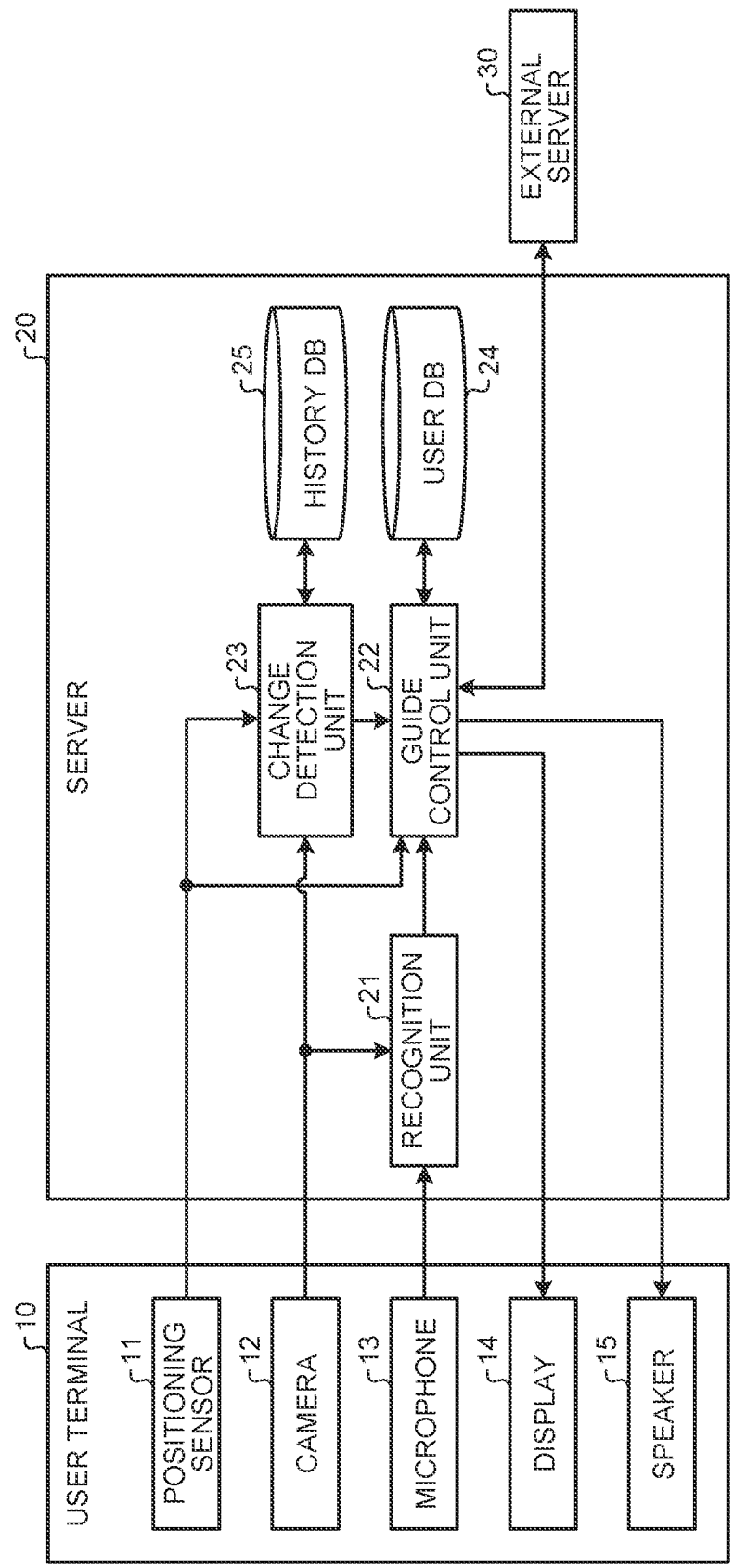
FIG. 2 is a block diagram illustrating a functional configuration example of a traveling assistance system according to an embodiment.

In the following, a traveling assistance system according to the embodiment will be described in detail with specific examples. FIG. 2 is a block diagram illustrating a functional configuration example of the traveling assistance system according to the embodiment. The traveling assistance system according to the embodiment includes, for example, the user terminal 10 used by the user and a server 20 in a cloud environment (example of the "information processing device" of the present disclosure), and can be configured as a network-type information processing system in which communication therebetween is performed by utilization of a network.

In the traveling assistance system according to the embodiment, the user terminal 10 used by the user registered in advance can be connected to the server 20, for example, through predetermined authentication processing. Unique identification information (user ID) is given to the user by user registration in advance, and information of each user is managed by this user ID. In the user registration, in addition to authentication information such as a password necessary for authentication, information indicating a characteristic of the user is registered as one of pieces of information necessary for processing in the server 20.

As illustrated in FIG. 2, the user terminal 10 includes a sensor group including a positioning sensor 11 such as a global positioning system (GPS) sensor that measures a current position, a camera 12 that images a surrounding environment of the current position, and a microphone 13 that records sound. Also, the user terminal 10 includes an output device including a display 14 that displays an image and a speaker 15 (including earphone speaker) that outputs sound. Although the user terminal 10 includes, in addition to these sensor group and output device, a computer system that executes various kinds of processing on the basis of software, a communication module to communicate with an external device such as the server 20, and the like, illustration thereof is omitted in FIG. 2.

When connected to the server 20, the user terminal 10 transmits information such as a current position (current position of the user) measured by the positioning sensor 11, an image of a surrounding environment of the current position which image is captured by the camera 12, and a sound recorded by the microphone 13 to the server 20 as needed via the network. Also, the user terminal 10 receives the guide information generated by the server 20 via the network, and performs an output thereof by the output device such as the display 14 or the speaker 15.

An example of the user terminal 10 is a smartphone. In a case where the smartphone is used as the user terminal 10, as illustrated in FIG. 1, the image of the surrounding environment of the current position which image is captured by the camera 12 is displayed on the display 14, and visual guide information generated by the server 20 is superimposed on this image. Also, audio guide information is output from the speaker 15.

Furthermore, the user terminal 10 may be configured as an eyeglass-type head mounted display (HMD) mounted on a head of the user. In a case of a non-see-through HMD, similarly to the smartphone, the image of the surrounding environment of the current position which image is captured by the camera 12 is displayed on the display 14 corresponding to an eyeglass lens portion, and the visual guide information generated by the server 20 is superimposed on this image. On the other hand, in a case of a see-through HMD, an actual optical image from the surrounding environment of the current position is transmitted through the display 14 corresponding to an eyeglass lens portion and visually recognized by the user. The visual guide information generated by the server 20 is superimposed in such a manner as to be superimposed on this optical image from the surrounding environment which image is transmitted through the display 14. The audio guide information is output from the speaker 15.

Furthermore, the user terminal 10 may be configured as an in-vehicle system including a head up display (HUD) as the display 14. In this case, an actual optical image from the surrounding environment of the current position is transmitted through a windshield of a vehicle and visually recognized by the user (driver of the vehicle). The visual guide information generated by the server 20 is projected and displayed on the windshield by the HUD in such a manner as to be superimposed on this optical image from the surrounding environment which image is transmitted through the windshield. The audio guide information is output from the speaker 15.

Note that the above examples are not the limitations, and any information equipment can be used as the user terminal 10 as long as a function of sensing the current position and the surrounding environment and a function of outputting the guide information generated by the server 20 are included. In the following description, it is assumed that the user terminal 10 is a smartphone.

The server 20 is a server computer that provides a service specific to the traveling assistance system according to the embodiment. As illustrated in FIG. 2, this server 20 includes a recognition unit 21, a guide control unit 22, and a change detection unit 23 as functional units to assist traveling of the user in cooperation with the user terminal 10. In addition, as databases that hold information necessary for processing in the guide control unit 22 and the change detection unit 23, the server 20 includes a user DB 24 referred to by the guide control unit 22 and a history DB 25 referred to by the change detection unit 23.

The recognition unit 21 is a functional unit that recognizes the surrounding environment of the current position of the user. For example, the recognition unit 21 performs image recognition processing on the image of the surrounding environment of the current position which image is captured by the camera 12 of the user terminal 10, and recognizes an object, a character, or the like in the image. Also, the recognition unit 21 performs speech recognition processing on the sound recorded by the microphone 13 of the user terminal 10 and converts the sound into text.

Recognition algorithm for the recognition unit 21 to recognize the surrounding environment of the current position of the user is not specifically limited, and known recognition algorithm may be used. For example, a configuration in which a deep neural network (DNN) trained by deep learning (DL) to output information useful for generating guide information is used as the recognition unit 21, an image captured by the camera 12 or a sound recorded by the microphone 13 is input to the DNN, and an output from this DNN is acquired as a recognition result may be employed.

The guide control unit 22 is a functional unit that generates guide information corresponding to a characteristic of the user by using a recognition result of the recognition unit 21, and that causes the output device such as the display 14 or the speaker 15 of the user terminal 10 to perform an output thereof. Specifically, in a case where the change detection unit 23 (described later) detects a changed portion in the surrounding environment of the current position, this guide control unit 22 generates guide information including information causing the user to recognize this changed portion, and causes the output device such as the display 14 or the speaker 15 of the user terminal 10 to perform an output thereof.

Figure 3:
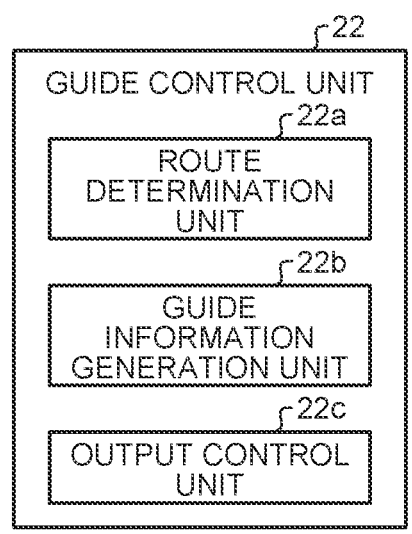
FIG. 3 is a block diagram illustrating a configuration example of a guide control unit.

FIG. 3 is a block diagram illustrating a configuration example of the guide control unit 22. For example, as illustrated in FIG. 3, the guide control unit 22 includes a route determination unit 22a, a guide information generation unit 22b, and an output control unit 22c.

On the basis of a current position measured by the positioning sensor 11 of the user terminal 10 and a destination set by the user, the route determination unit 22a determines an optimal route from the current position to the destination. At this time, the route determination unit 22a may acquire, from an external server 30, map data, operation information of public transportation, and the like necessary for determining the optimal route. The destination is set by the user, for example, when the user terminal 10 is connected to the server 20 and a traveling assistance service is started, and is recorded into a user data table held in the user DB 24.

An example of the user data table held in the user DB 24 is illustrated in FIG. 4. In this user data table 41 illustrated in FIG. 4, a characteristic of the user which characteristic is specified by the user at the time of user registration, and the destination set by the user at the start of the traveling assistance service are recorded in association with the user ID. The route determination unit 22a can grasp the destination of the user by searching the user data table 41 with the user ID as a key.

The guide information generation unit 22b uses the recognition result of the recognition unit 21 and generates guide information to guide the user to the destination according to the optimal route determined by the route determination unit 22a. As described above, the guide information includes various kinds of information that can be generated by utilization of the recognition result of the recognition unit 21. The guide information generation unit 22b in the present embodiment generates guide information assumed to be highly useful according to the characteristic of the user.

Also, the output control unit 22c causes the output device such as the display 14 or the speaker 15 of the user terminal 10 to output the guide information, which is generated by the guide information generation unit 22b, by an output method corresponding to the characteristic of the user.

Examples of the characteristic of the user include a characteristic indicating audiovisual ability (such as total blindness, amblyopia, nearsightedness, impaired color vision, or hearing impairment), a characteristic indicating an eye level (such as a child or short adult), a characteristic indicating nationality (such as a foreigner), and whether the user is likely to get lost. Such a characteristic of the user is specified by the user at the time of the user registration as described above, and is recorded into the user data table 41 held in the user DB 24 (see FIG. 4). The guide information generation unit 22b and the output control unit 22c can grasp the characteristic of the user by searching the user data table 41 with the user ID as a key.

For example, the guide information generation unit 22b and the output control unit 22c can generate the guide information corresponding to the characteristic of the user according to a previously-defined guide information generation rule, and cause the output device of the user terminal 10 to perform an output thereof. The guide information generation rule is a rule that defines a form of the guide information assumed to be highly useful according to the characteristic of the user. A specific example of the generation and output of the guide information corresponding to the characteristic of the user will be described in the following.

For example, in a case where the characteristic of the user is visual impairment (total blindness), the guide information generation unit 22b uses the recognition result of the recognition unit 21 and preferentially generates, as the guide information corresponding to the user characteristic, a sound describing an obstacle on a road where the user is traveling, a state of the road, or the like, a sound describing a position of an entrance of a building, or a sound reading out characters on a sign, a guideboard, or the like, for example. Then, the output control unit 22c causes the speaker 15 of the user terminal 10 to output the sound generated as the guide information by the guide information generation unit 22b.

Also, in a case where the characteristic of the user is nearsightedness, amblyopia, or the like, the guide information generation unit 22b uses the recognition result of the recognition unit 21 and preferentially generates, as the guide information corresponding to the user characteristic, text in which small characters on the sign, the guideboard, or the like is enlarged, a sound reading out these characters, or the like. Then, the output control unit 22c causes the text, which is generated as the guide information by the guide information generation unit 22b, to be superimposed and displayed on a region where the sign, the guideboard, or the like appears on the image of the surrounding environment of the current position which image is displayed on the display 14 of the user terminal 10, and causes the speaker 15 of the user terminal 10 to output the sound generated as the guide information by the guide information generation unit 22b.

Also, in a case where the characteristic of the user is impaired color vision, for example, when a sound to guide the user to the destination by using an object to be a landmark is generated as the guide information by utilization of the recognition result of the recognition unit 21, the guide information generation unit 22b performs the generation while replacing a description of the object by a hardly-distinguished color with a description using a shape or the like of the object. Specifically, for example, instead of generating a sound such as "turn right at a pink and light blue signboard", a sound such as "turn right at a stripe signboard on which XXX is written" is generated as the guide information corresponding to the user characteristic. Then, the output control unit 22c causes the speaker 15 of the user terminal 10 to output the sound generated as the guide information by the guide information generation unit 22b.

Also, in a case where the characteristic of the user is hearing impairment, the guide information generation unit 22b uses the recognition result of the recognition unit 21 and generates, as the guide information corresponding to the user characteristic, text or the like describing contents of the sound recorded by the microphone 13 of the user terminal 10, for example. Then, the output control unit 22c causes the text, which is generated as the guide information by the guide information generation unit 22b, to be superimposed and displayed on the image of the surrounding environment of the current position which image is displayed on the display 14 of the user terminal 10.

Also, in a case where the characteristic of the user is a child or a short adult, the guide information generation unit 22b uses the recognition result of the recognition unit 21 and preferentially generates, as the guide information corresponding to the characteristic of the user, a sound to guide the user to the destination with an object at a low position which object is easily visible to the user being a landmark, for example. In addition, the guide information generation unit 22b may generate, as the guide information, a sound or the like to guide the user to the destination with an object at a relatively high position as a landmark after generating, as the guide information, a sound prompting the user to raise a visual field upward. Then, the output control unit 22c causes the speaker 15 of the user terminal 10 to output the sound generated as the guide information by the guide information generation unit 22b.

Also, in a case where the characteristic of the user is a foreigner, the guide information generation unit 22b uses the recognition result of the recognition unit 21 and preferentially generates, as the guide information corresponding to the user characteristic, text acquired by translation of characters on a sign, a guideboard, or the like related to the destination of the user, for example. Then, the output control unit 22c superimposes and displays the text, which is generated as the guide information by the guide information generation unit 22b, on a region where the sign, guideboard, or the like appears on the image of the surrounding environment of the current position which image is displayed on the display 14 of the user terminal 10.

Also, in a case where the characteristic of the user is a person who is likely to get lost, the guide information generation unit 22b uses the recognition result of the recognition unit 21 and preferentially generates a mark to direct attention to an object used as a landmark repeatedly, a sound to guide the user to the destination by using the object used as the landmark repeatedly, and the like, as the guide information corresponding to the characteristic of the user, for example. Then, the output control unit 22c causes the mark, which is generated as the guide information by the guide information generation unit 22b, to be superimposed and displayed on a region where the object serving as the landmark appears on the image of the surrounding environment of the current position which image is displayed on the display 14 of the user terminal 10, and causes the speaker 15 of the user terminal 10 to output the sound generated as the guide information by the guide information generation unit 22b.

Note that the examples described above are one aspect of the guide information corresponding to the characteristic of the user, and the guide information corresponding to the characteristic of the user is not limited to these examples. The guide information corresponding to the characteristic of the user only needs to be optimized by, for example, the definition of the guide information generation rule, and there are various aspects in addition to the above-described examples. Also, pieces of guide information assumed to be highly useful may be prioritized according to the characteristic of the user, and generation and output thereof may be controlled in order of priority.

Furthermore, in a case where it is determined that the user has visited the current position in the past, and a changed portion in the surrounding environment of the current position is detected by the change detection unit 23 (described later), the guide information generation unit 22b generates guide information including information causing the user to recognize the changed portion, and the output control unit 22c causes the output device of the user terminal 10 to output the guide information.

The change detection unit 23 is a functional unit that determines whether the user has visited the current position in the past, and detects a changed portion in the surrounding environment of the current position in a case of determining that there is a previous visit. For example, the change detection unit 23 can determine whether the user has visited the current position in the past by using a user traveling history table held in the history DB 25.

An example of the user traveling history table held in the history DB 25 is illustrated in FIG. 5. This user traveling history table 42 illustrated in FIG. 5 is generated for each registered user and stored in the history DB 25. In the user traveling history table 42 for each registered user, positional information of a position visited by the user in the past, a history image acquired by imaging of a surrounding environment of the position, and a time when the history image is captured are recorded in association with each other.

This user traveling history table 42 is generated when the user uses the traveling assistance system according to the embodiment, for example. That is, a current position measured by the positioning sensor 11 of the user terminal 10 and transmitted to the server 20 in the past and an image captured by the camera 12 of the user terminal 10 and transmitted to the server 20 at that time are recorded in the user traveling history table 42 in association with the time respectively as the positional information of the position visited by the user in the past and the history image acquired by imaging of the surrounding environment of the position. The history image may be a moving image including continuous frames, or may be a still image cut out from the moving image.

For example, the change detection unit 23 acquires the current position measured by the positioning sensor 11 of the user terminal 10 and transmitted to the server 20 at the present moment, and the image of the surrounding environment of the current position which image is captured by the camera 12 of the user terminal 10 and transmitted to the server 20 at the present moment. Then, the change detection unit 23 refers to the user traveling history table 42, which corresponds to the user using the user terminal 10 that transmits the current position and the image, among the user traveling history tables 42 held in the history DB 25, and determines that the user has visited the current position in the past in a case where positional information corresponding to the current position (that is, positional information of a position that can be regarded as the same place as the current position) is included in the positional information recorded in this user traveling history table 42. Note that in a case where positional information indicating an imaging place is added as metadata to the image of the surrounding environment of the current position which image is captured by the camera 12, the determination may be performed by utilization of the positional information instead of the current position measured by the positioning sensor 11.

Then, in a case of determining that the user has visited the current position in the past, the change detection unit 23 detects a portion changed from when the user has visited the current position in the past in the surrounding environment of the current position on the basis of the acquired image of the surrounding environment of the current position (image captured by the camera 12 of the user terminal 10 at the present moment) and the history image recorded in the user traveling history table 42 in association with the positional information corresponding to the current position.

For example, the change detection unit 23 performs collation after aligning the acquired image and the history image with reference to a landmark or the like in the images. Then, in a case where there is a difference in a non-moving object such as a building, a sign, or a guideboard in the images, the difference is detected as a changed portion. Specifically, for example, in a case where an object serving as a landmark has disappeared, appearance of the object serving as the landmark has changed by creation of a shielding object, a change in a position of an entrance, a change in a color or material due to remodeling, a change in a tenant, or the like, or an object serving as a landmark has been newly formed as compared with when the user has visited the current position in the past, detection thereof is performed by the change detection unit 23.

Note that the history image used to detect the changed portion is not necessarily the history image recorded in the user traveling history table 42 of the user. For example, a user traveling history table 42 of another user is searched, and when there is a history image of another user which image is captured at a position close to the current position at time close to the time when the user has visited the current position in the past, a changed portion may be detected by utilization of the history image. Also, an image captured at a position close to the current position at time close to the time when the user has visited the current position in the past may be acquired from the external server 30 or the like, and a changed portion may be detected by utilization of the acquired image as a history image.

As described above, the guide control unit 22 generates guide information corresponding to the characteristic of the user and causes the output device of the user terminal 10 to perform an output thereof. In a case where a changed portion in the surrounding environment of the current position is detected by the change detection unit 23, the guide control unit 22 generates guide information including information causing the user to recognize the changed portion, and causes the output device of the user terminal 10 to perform an output thereof.

Figure 6:
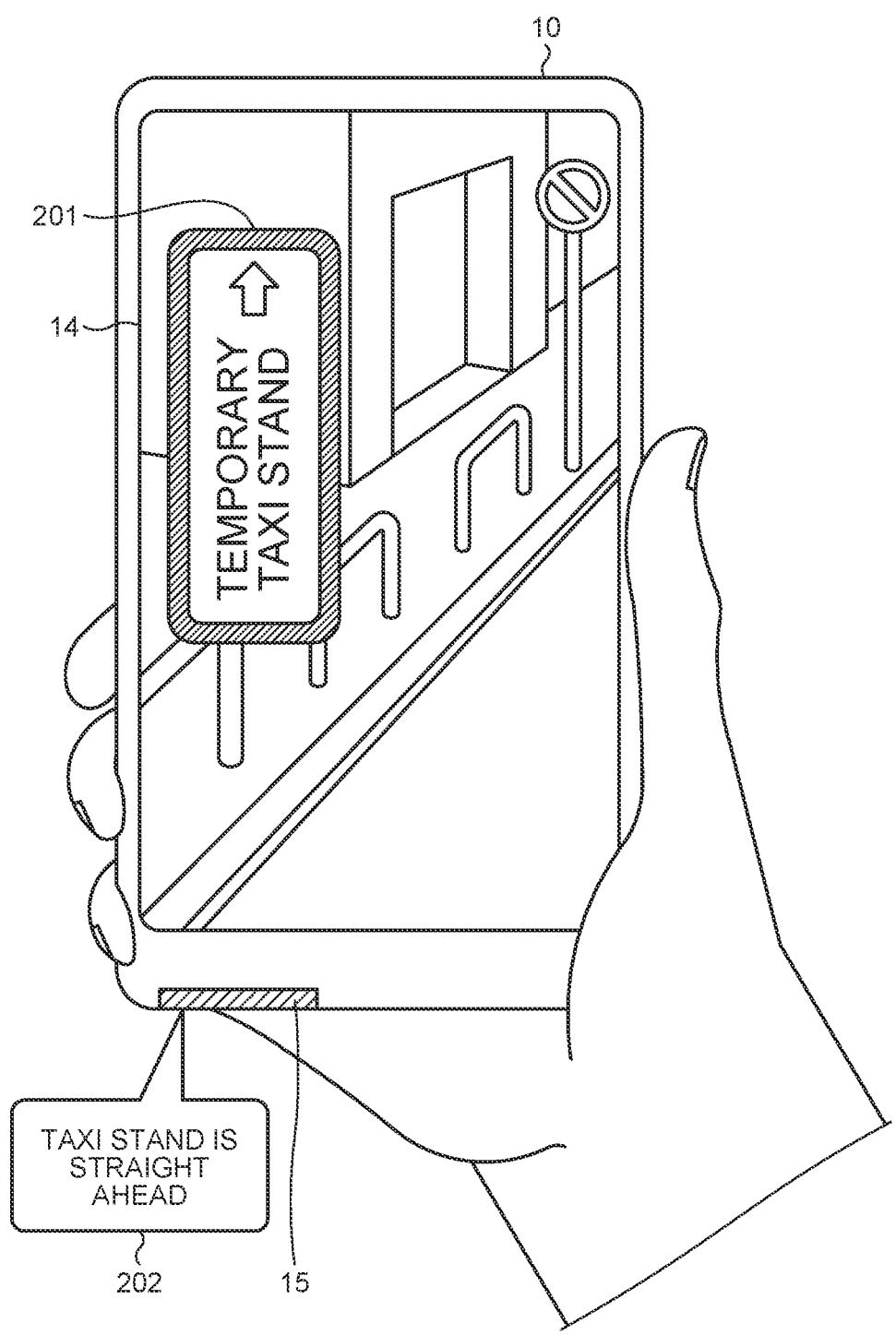
FIG. 6 is a view illustrating an example of guide information causing a user to recognize a changed portion.

An example of the guide information causing the user to recognize the changed portion is illustrated in FIG. 6. In this example illustrated in FIG. 6, a case where a guideboard introducing a direction of a temporary taxi stand that has not been present when the user has visited in the past is provided in a surrounding environment of a current position is assumed.

In this case, the guideboard introducing the direction of the temporary taxi stand is detected as a changed portion by the change detection unit 23. The guide information generation unit 22b of the guide control unit 22 generates guide information including, for example, a mark 201 to direct attention to the guideboard detected as the changed portion by the change detection unit 23, a sound 202 to describe contents of the guideboard, such as "the taxi stand is straight ahead", and the like. Then, the output control unit 22c causes the mark 201, which is generated as the guide information by the guide information generation unit 22b, to be superimposed and displayed in such a manner as to surround the guideboard introducing the direction of the temporary taxi stand on an image of the surrounding environment of the current position which image is displayed on the display 14 of the user terminal 10, and causes the speaker 15 of the user terminal 10 to output the sound 202 generated as the guide information by the guide information generation unit 22b.

Note that in the example illustrated in FIG. 6, only the guide information such as the mark 201 and the sound 202 for causing the user to recognize the guideboard detected as the changed portion is illustrated. However, in addition to these pieces of guide information, other guide information generated according to the characteristic of the user may be displayed on the display 14 of the user terminal 10 or output from the speaker 15. Also, the guide information for causing the user to recognize the changed portion may be generated according to the characteristic of the user, or the guide information for causing the user to recognize the changed portion may be output from the output device of the user terminal 10 by an output method corresponding to the characteristic of the user.

Incidentally, it is desirable that the guide information to be output from the output device of the user terminal 10 can flexibly respond to a change in a situation, and the like in a process of traveling to the destination by the user. For example, an optimal route for the user to travel from the current position to the destination is determined as needed by the above-described route determination unit 22a, and in a case where this optimal route changes, it is desirable to update the guide information to be output from the output device of the user terminal 10 according to the changed optimal route.

Figure 7:
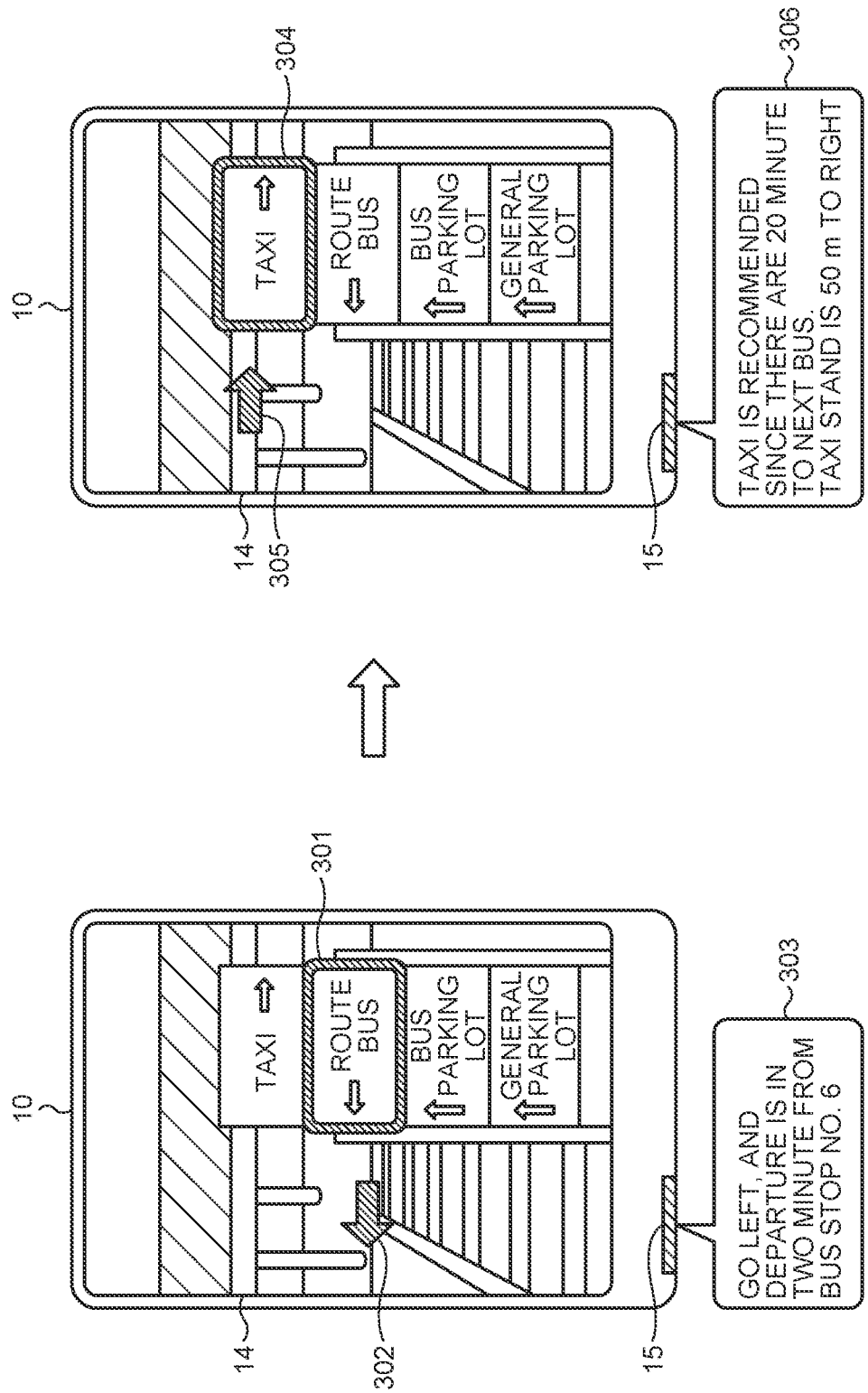
FIG. 7 is a view illustrating an example of guide information updated according to a change in an optimal route.

An example of the guide information updated according to the change in the optimal route is illustrated in FIG. 7. In this example illustrated in FIG. 7, a case where an optimal route is changed to a route using a taxi since a bus has departed by elapse of time although a route using the bus has been determined as an optimal route to travel to a destination in a situation in which the user checks a guideboard introducing directions of boarding places of various traveling means is assumed.

In this case, before the optimal route is changed, the guide information generation unit 22b of the guide control unit 22 generates, for example, guide information such as a mark 301 to direct attention to a display portion of the guideboard which portion introduces a direction of a stop of a route bus, a mark 302 indicating the direction of the stop of the route bus, and a sound 303 prompting traveling by the route bus, such as "go left, and a departure is in two minutes from the bus stop No. 6".

Then, the output control unit 22c causes the marks 301 and 302, which are generated as the guide information by the guide information generation unit 22b, to be superimposed and displayed on the image of the surrounding environment of the current position which image is displayed on the display 14 of the user terminal 10, and causes the speaker 15 of the user terminal 10 to output the sound 303 generated as the guide information by the guide information generation unit 22b.

Also, after the optimal route is changed, guide information such as a mark 304 to direct attention to a display portion of the guideboard which portion introduces a direction of a taxi stand, a mark 305 that indicates the direction of the taxi stand, and a sound 306 prompting traveling by the taxi, such as "a taxi is recommended since there are 20 minutes to the next bus. The taxi stand is 50 m to the right" is generated, for example. Then, the output control unit 22c causes the marks 304 and 305, which are generated as the guide information by the guide information generation unit 22b, to be superimposed and displayed on the image of the surrounding environment of the current position which image is displayed on the display 14 of the user terminal 10, and causes the speaker 15 of the user terminal 10 to output the sound 306 generated as the guide information by the guide information generation unit 22b.

Figure 8:
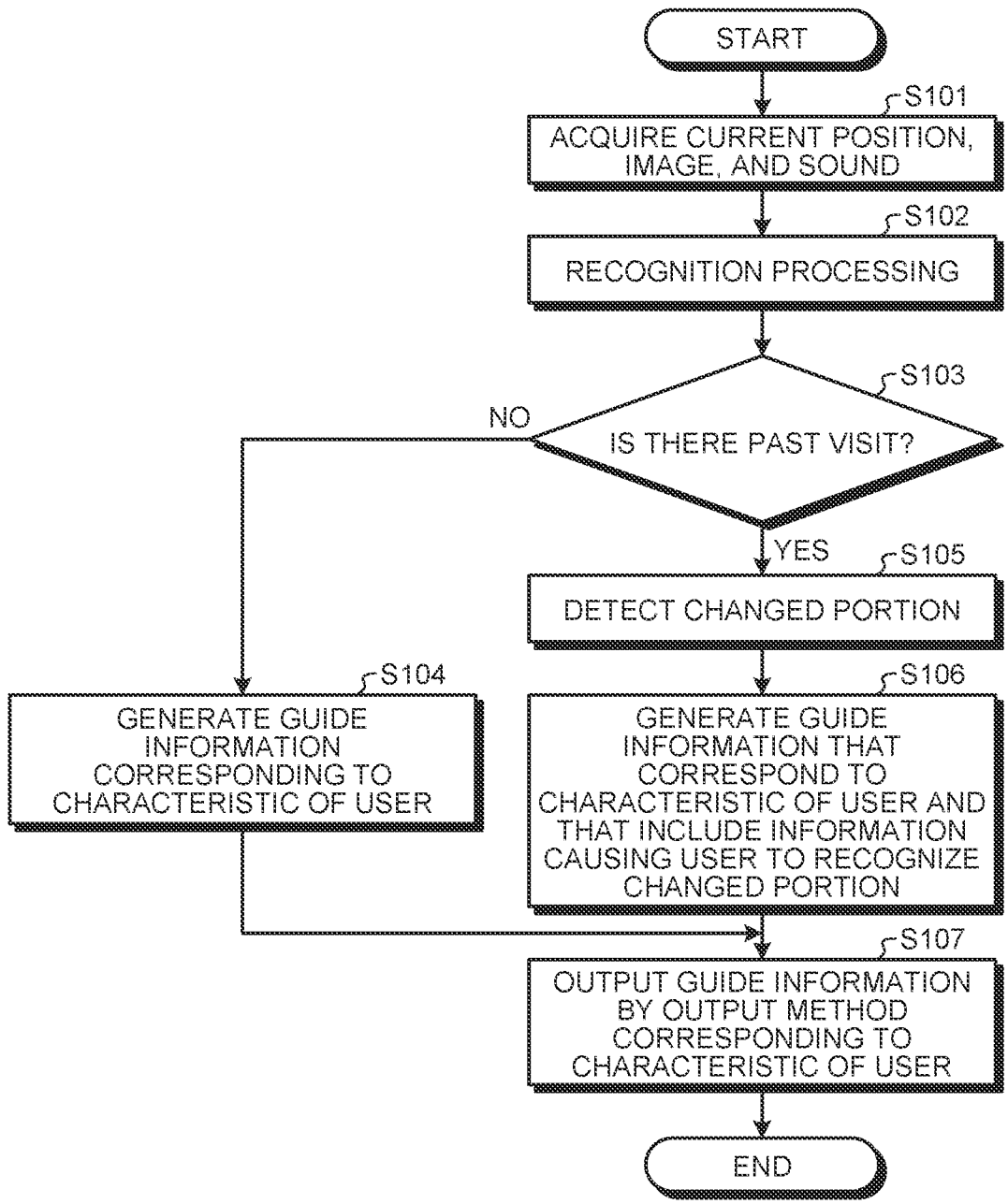
FIG. 8 is a flowchart illustrating a processing procedure of a server.

Next, an outline of an operation of the server 20 in the traveling assistance system according to the embodiment will be described with reference to FIG. 8. FIG. 8 is a flowchart illustrating a processing procedure of the server 20, and illustrating a flow of processing repeatedly executed at a predetermined cycle by the server 20 after the user terminal 10 is connected to the server 20 through predetermined authentication processing and the like and a destination is set by the user. After being connected to the server 20, the user terminal 10 transmits the current position measured by the positioning sensor 11, the image of the surrounding environment of the current position which image is captured by the camera 12, the sound recorded by the microphone 13, and the like to the server 20 as needed in synchronization with the processing cycle in the server 20.

When the processing is started, the server 20 acquires the current position, the image, and the sound transmitted from the user terminal 10 (Step S101).

Then, the recognition unit 21 performs recognition processing on the image and sound transmitted from the user terminal 10, and passes a recognition result to the guide control unit 22 (Step S102). Also, the change detection unit 23 refers to the user traveling history table 42 held in the history DB 25 and determines whether the user has visited the current position in the past (Step S103).

Here, in a case where it is determined that the user has not visited the current position in the past (Step S103: No), the guide control unit 22 grasps the characteristic of the user with reference to the user data table 41 held in the user DB 24, generates the guide information corresponding to the characteristic of the user by using the recognition result of the recognition unit 21 (Step S104), and proceeds to Step S107.

On the other hand, in a case where it is determined in Step S103 that the user has visited the current position in the past (Step S103: Yes), the change detection unit 23 detects a changed portion in the surrounding environment of the current position on the basis of the image transmitted from the user terminal 10 and the history image recorded in the user traveling history table 42 held in the history DB 25 (Step S105). Then, the guide control unit 22 grasps the characteristic of the user with reference to the user data table 41 held in the user DB 24, and generates, by using the recognition result of the recognition unit 21, guide information that corresponds to the characteristic of the user and that includes the information causing the user to recognize the changed portion (Step S106).

Then, the guide control unit 22 causes the output device such as the display 14 or the speaker 15 of the user terminal 10 to output the guide information generated in Step S104 or Step S106 by an output method corresponding to the characteristic of the user (Step S107), and ends the processing.

As described above in detail with reference to the specific examples, according to the traveling assistance system of the embodiment, the server 20 generates the guide information corresponding to the characteristic of the user by using the recognition result acquired by recognition of the surrounding environment of the current position of the user, and causes the output device of the user terminal 10 to perform an output thereof. At this time, the server 20 determines whether the user has visited the current position in the past, and detects a changed portion in the surrounding environment of the current position in a case of determining that there has been a visit. Then, guide information including information causing the user to recognize the changed portion is generated and displayed on the output device of the user terminal 10. Thus, according to the traveling assistance system of the embodiment, it is possible to present guide information highly useful for the user and to appropriately assist traveling of the user.

In addition, according to the traveling assistance system of the embodiment, the server 20 holds the user traveling history table 42 in which positional information of a position visited by the user in the past and a history image acquired by imaging of a surrounding environment of the position are associated with each other. Then, in a case where positional information corresponding to the current position is included in the user traveling history table 42, it is determined that the user has visited the current position in the past, and an image acquired by imaging of the surrounding environment of the current position is collated with the history image and a changed portion is detected. Thus, according to the traveling assistance system of the embodiment, it is possible to accurately and easily determine whether the user has visited the current position in the past, and to easily detect the changed portion.

Also, according to the traveling assistance system of the embodiment, the server 20 causes the output device of the user terminal 10 to output the guide information, which is generated according to the characteristic of the user, by an output method corresponding to the characteristic of the user. Thus, guide information highly useful for the user can be presented to the user in an easy-to-understand manner.

In addition, according to the traveling assistance system of the embodiment, the server 20 generates guide information to guide the user to a destination and updates, in a case where an optimal route to the destination changes, the guide information according to the changed optimal route. Thus, it is possible to appropriately present the guide information in a manner of flexibly responding to a change in a situation in a process of traveling to the destination by the user.

3. Modification Example

Note that the traveling assistance system according to the above-described embodiment can be implemented with various modifications. For example, a state of the output device of the user terminal 10 may be managed on a side of the server 20, and a mode of guide information to be displayed on the display 14 may be changed to a sound and an output thereof from the speaker 15 may be performed in a case where a trouble is generated in the display 14 of the user terminal 10. Alternatively, in a case where a trouble is generated in the speaker 15 of the user terminal 10, a mode of guide information to be output from the speaker 15 may be converted into text and a display thereof onto the display 14 may be performed.

Also, a state of the sensor group of the user terminal 10 may be managed on the side of the server 20, and a surrounding environment of a current position may be recognized with a focus being on a sound recorded by the microphone 13 in a case where a trouble is generated in the camera 12 of the user terminal 10. Alternatively, in a case where a trouble is generated in the microphone 13 of the user terminal 10, the surrounding environment of the current position may be recognized with a focus being on an image captured by the camera 12.

Also, in a case where a characteristic of the user is hearing impairment, when a plurality of announcement voices is recorded by the microphone 13 of the user terminal 10, a voice estimated to be useful information for the user among the plurality of announcement voices may be extracted and output from the speaker 15 at high volume. Furthermore, the voice estimated to be useful information for the user among the plurality of announcement voices recorded by the microphone 13 of the user terminal 10 may be converted into text and displayed as the guide information on the display 14.

Also, for example, in a case of a situation in which the surrounding environment of the current position is dark and it is difficult for the user to visually check characters or the like on the guideboard, text acquired as a result of recognition of the characters or the like easily overlooked due to darkness in the image captured by the camera 12 of the user terminal 10 may be preferentially displayed as the guide information on the display 14.

Also, when guide information causing the user to recognize a changed portion in the surrounding environment of the current position is presented, for example, guide information to which a description that the change is generated due to a difference in an environmental condition such as weather, such as a door being closed due to rain, is added may be generated and caused to be output from the output device of the user terminal 10.

Also, in a case where the surrounding environment of the current position cannot be recognized and the guide information using a recognition result cannot be presented, for example, guide information for guiding the user to a place in which information useful for traveling of the user can be acquired and which is, for example, a police box or an information center around the current position may be generated and caused to be output from the output device of the user terminal 10.

Also, guide information presented to each user may be held in association with positional information. When guide information is presented to a certain user, guide information presented at the same place to another user having a common characteristic with the user may be presented as it is.

Also, in a case where a changed portion in a surrounding environment is detected when guide information is presented to a certain user, information indicating the changed portion may be held in association with positional information. When guide information including information causing the changed portion in the surrounding environment to be recognized is presented to another user, the guide information including the information causing the changed portion in the surrounding environment to be recognized may be presented by utilization of the information that indicates the changed portion, and that is detected and held previously.

Also, when visual guide information is presented to the user, all pieces of guide information that can be generated by utilization of a recognition result acquired by recognition of a surrounding environment may be displayed on the display 14 of the user terminal 10 regardless of a characteristic of the user, and guide information estimated to be highly useful according to the characteristic of the user among these pieces of guide information may be displayed with highlight expression that visually stands out. Alternatively, instead of causing the guide information estimated to be highly useful according to the characteristic of the user to stand out visually, guide information other than what is estimated to be highly useful according to the characteristic of the user may be made visually inconspicuous.

Also, for example, in a case where a voice command such as "provide all" is input or in a case where an "all information display" mode is selected as an operation mode when the visual guide information is presented to the user, all pieces of guide information that can be generated by utilization of the recognition result acquired by recognition of the surrounding environment may be displayed on the display 14 of the user terminal 10 regardless of the characteristic of the user.

In addition, a processing procedure, a specific name, and information including various kinds of data and parameters illustrated in the above document or drawings can be arbitrarily changed unless otherwise specified. For example, various kinds of information illustrated in each drawing are not limited to the illustrated information.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions. For example, any of the functions of the recognition unit 21, the guide control unit 22, and the change detection unit 23 described above may be distributed or integrated.

Also, the above-described embodiments and modification examples can be arbitrarily combined in a range in which the processing contents do not contradict each other.

Also, an effect described in the present description is merely an example and is not a limitation, and there may be a different effect.

4. Hardware Configuration Example

Figure 9:
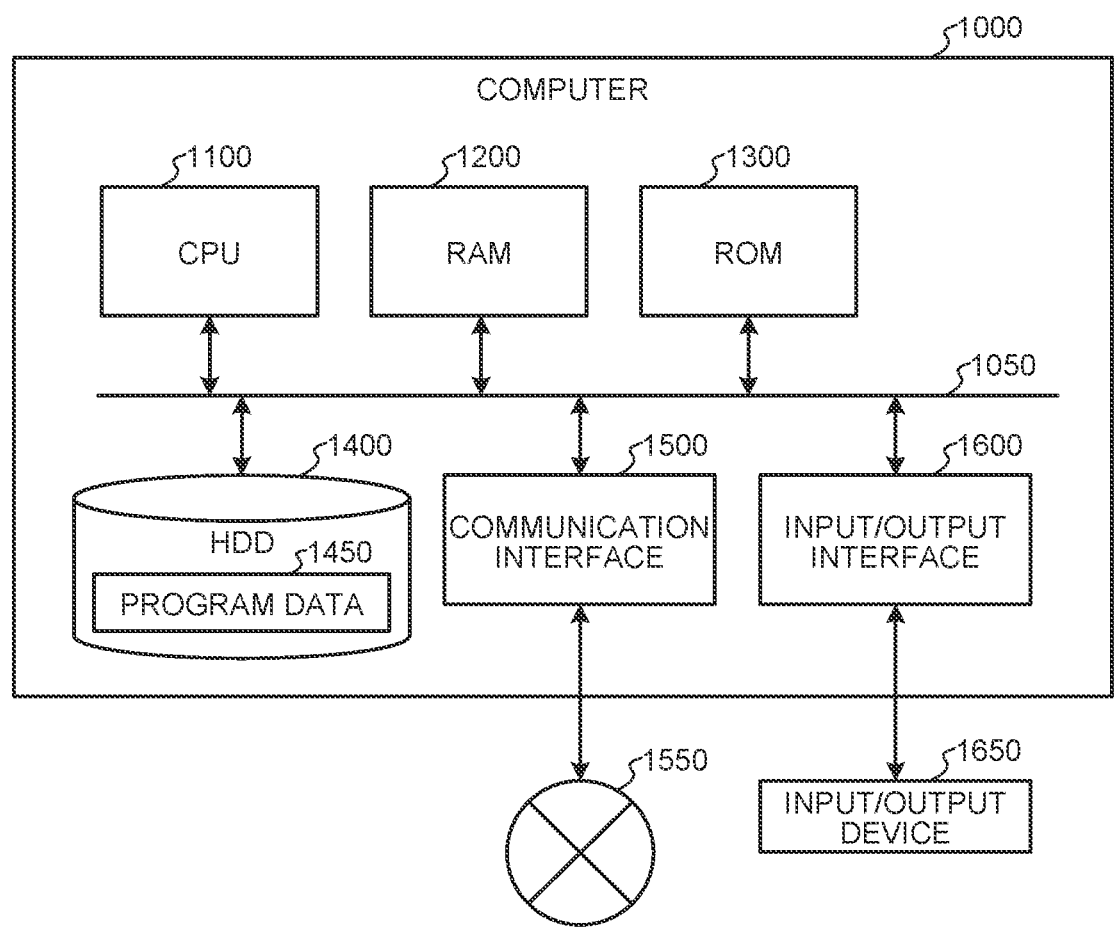
FIG. 9 is a hardware configuration diagram illustrating an example of a computer that realizes a function of the server.

The server 20 in the traveling assistance system according to the above-described embodiment is realized by utilization of a computer 1000 having a configuration in a manner illustrated in FIG. 9, for example. FIG. 9 is a hardware configuration diagram illustrating an example of the computer 1000 that realizes functions of the server 20. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit.

For example, the CPU 1100 expands the programs, which are stored in the ROM 1300 or the HDD 1400, in the RAM 1200 and executes processing corresponding to various programs.

The ROM 1300 stores a boot program such as a basic input output system (BIOS) executed by the CPU 1100 during activation of the computer 1000, a program that depends on hardware of the computer 1000, and the like.

The HDD 1400 is a recording medium that can be read by the computer 1000 and that non-temporarily stores a program executed by the CPU 1100, data used by the program, and the like. Specifically, the HDD 1400 stores, as an example of program data 1450, a program for causing the computer 1000 to realize the functions of the recognition unit 21, the guide control unit 22, and the change detection unit 23 of the server 20 according to the present disclosure. Also, the user DB 24 and the history DB 25 of the server 20 according to the present disclosure are constructed in the HDD 1400.

The communication interface 1500 is an interface with which the computer 1000 is connected to an external network 1550 (such as the Internet). For example, the CPU 1100 receives data from another equipment or transmits data generated by the CPU 1100 to another equipment via the communication interface 1500.

The input/output interface 1600 is an interface to connect an input/output device 1650 and the computer 1000. For example, the CPU 1100 receives data from an input device such as a touch screen via the input/output interface 1600. Also, the CPU 1100 transmits data to an output device such as a display or a speaker via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the server 20, the CPU 1100 of the computer 1000 realizes the functions of the recognition unit 21, the guide control unit 22, and the change detection unit 23 by executing a program loaded on the RAM 1200. In addition, the HDD 1400 stores a program according to the present disclosure, the user data table 41 in the user DB 24, the user traveling history table 42 in the history DB 25, and the like. Note that the CPU 1100 reads the program data 1450 from the HDD 1400 and performs execution thereof, but may acquire these programs from another device via the external network 1550 in another example.

5. Supplementary Note

Note that the present technology can also have the following configurations.

(1) An information processing device comprising:
a recognition unit that recognizes a surrounding environment of a current position of a user;
a guide control unit that generates guide information corresponding to a characteristic of the user by using a recognition result of the recognition unit and that causes an output device to perform an output thereof; and
a change detection unit that detects a changed portion in the surrounding environment of the current position in a case where it is determined that the user has visited the current position in a past, wherein
in a case where the change detection unit detects the changed portion, the guide control unit generates the guide information including information causing the user to recognize the changed portion.

(2) The information processing device according to (1), wherein
the change detection unit detects the changed portion on a basis of an image acquired by imaging of the surrounding environment of the current position and a history image acquired by imaging of the surrounding environment of the current position in the past.

(3) The information processing device according to (2), wherein
the change detection unit determines whether the user has visited the current position in the past on a basis of the current position and positional information associated with the history image.

(4) The information processing device according to any one of (1) to (3), wherein
the guide control unit causes the output device to output the guide information by an output method corresponding to the characteristic of the user.

(5) The information processing device according to (4), wherein
the output method includes an output by a display and an output by a sound.

(6) The information processing device according to any one of (1) to (5), wherein
the guide control unit generates the guide information to guide the user to a destination and updates, in a case where an optimal route to the destination changes, the guide information according to the changed optimal route.

(7) The information processing device according to any one of (1) to (6), wherein
the characteristic of the user includes a characteristic indicating audiovisual ability.

(8) The information processing device according to any one of (1) to (7), wherein
the characteristic of the user includes a characteristic indicating an eye level.

(9) The information processing device according to any one of (1) to (8), wherein
the characteristic of the user includes a characteristic indicating nationality.

(10) The information processing device according to any one of (1) to (9), wherein
the characteristic of the user includes whether the user is likely to get lost.

(11) An information processing method executed in an information processing device, the method comprising:
a recognition step of recognizing a surrounding environment of a current position of a user;
a guide control step of generating guide information corresponding to a characteristic of the user by using a recognition result of the recognition step, and of causing an output device to perform an output thereof; and
a change detection step of detecting a changed portion in the surrounding environment of the current position in a case where it is determined that the user has visited the current position in a past, wherein
in the guide control step, the guide information including information causing the user to recognize the changed portion is generated in a case where the changed portion is detected in the change detection step.

(12) A program for causing a computer to realize:
a function of a recognition unit that recognizes a surrounding environment of a current position of a user;

a function of a guide control unit that generates guide information corresponding to a characteristic of the user by using a recognition result of the recognition unit and that causes an output device to perform an output thereof; and a function of a change detection unit that detects a changed portion in the surrounding environment of the current position in a case where it is determined that the user has visited the current position in a past, wherein in a case where the change detection unit detects the changed portion, the guide control unit generates the guide information including information causing the user to recognize the changed portion.

REFERENCE SIGNS LIST

10 USER TERMINAL
11 POSITIONING SENSOR
12 CAMERA
13 MICROPHONE
14 DISPLAY
15 SPEAKER
20 SERVER
21 RECOGNITION UNIT
22 GUIDE CONTROL UNIT
23 CHANGE DETECTION UNIT
24 USER DB
25 HISTORY DB

The invention claimed is:

1. An information processing device, comprising:
a central processing unit (CPU) configured to:
recognize a surrounding environment of a current position of a user;
generate guide information based on the recognized surrounding environment, wherein the guide information corresponds to a characteristic of the user:
control, based on the generated guide information, an output device to perform an output; and
detect a changed portion in the surrounding environment of the current position based on determination that the user has visited the current position in a past, wherein the guide information includes information that causes the user to recognize the changed portion.

2. The information processing device according to claim 1, wherein the CPU is further configured to detect the changed portion based on an image acquired by imaging of the surrounding environment of the current position and a history image acquired by imaging of the surrounding environment of the current position in the past.

3. The information processing device according to claim 2, wherein the CPU is further configured to determine, based on the current position and positional information associated with the history image, whether the user has visited the current position in the past.

4. The information processing device according to claim 1, wherein the CPU is further configured to control the output device to output the guide information by an output method corresponding to the characteristic of the user.

5. The information processing device according to claim 4, wherein the output method corresponds to a display output and an audio output.

6. The information processing device according to claim 1, wherein the CPU is further configured to:
generate the guide information to guide the user to a destination; and
update, based on a change in an optimal route to the destination, the guide information according to the changed optimal route.

7. The information processing device according to claim 1, wherein the characteristic of the user indicates audiovisual ability of the user.

8. The information processing device according to claim 1, wherein the characteristic of the user indicates an eye level of the user.

9. The information processing device according to claim 1, wherein the characteristic of the user indicates a nationality of the user.

10. The information processing device according to claim 1, wherein the characteristic of the user includes whether the user is likely to get lost.

11. An information processing method, comprising:
in an information processing device:
a recognizing a surrounding environment of a current position of a user;
generating guide information based on the recognized surrounding environment, wherein the guide information corresponds to a characteristic of the user;
controlling, based on the generated guide information, an output device to perform an output; and
detecting a changed portion in the surrounding environment of the current position based on determination that the user has visited the current position in a past, wherein the guide information including information that causes the user to recognize the changed portion.

12. A non-transitory computer-readable medium having stored thereon, computer-executable instructions which, when executed by a computer, cause the computer to execute operations, the operations comprising:
a recognizing a surrounding environment of a current position of a user;
generating guide information based on the recognized surrounding environment, wherein the guide information corresponds to a characteristic of the user;
controlling, based on the generated guide information, an output device to perform an output; and
detecting a changed portion in the surrounding environment of the current position based on determination that the user has visited the current position in a past, wherein the guide information including information that causes the user to recognize the changed portion.

* * * * *